(12) United States Patent
Yamada

(10) Patent No.: US 7,294,171 B2
(45) Date of Patent: Nov. 13, 2007

(54) METHOD AND APPARATUS FOR DEGASSING COATING LIQUID

(75) Inventor: Hitoshi Yamada, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 347 days.

(21) Appl. No.: 10/998,745

(22) Filed: Nov. 30, 2004

(65) Prior Publication Data
US 2005/0115405 A1 Jun. 2, 2005

(30) Foreign Application Priority Data
Dec. 1, 2003 (JP) .............................. 2003-402002

(51) Int. Cl.
*B01D 19/00* (2006.01)
(52) U.S. Cl. .............................. 95/30; 96/175; 427/565
(58) Field of Classification Search .................... 95/30; 96/175; 427/565; 118/610
See application file for complete search history.

(56) References Cited

FOREIGN PATENT DOCUMENTS

| JP | 59-92003 A | 5/1984 |
|----|------------|--------|
| JP | 63-178807 A | 7/1988 |
| JP | 5-92103 A | 4/1993 |
| JP | 6-130547 A | 5/1994 |
| JP | 8-318102 A | 12/1996 |
| JP | 11-197406 A | 7/1999 |
| JP | 11-262601 A | 9/1999 |
| JP | 11-290611 A | 10/1999 |

OTHER PUBLICATIONS

Machine translation of Japan publication 11-197406; Jul. 27, 1999; Horiba LTD.*

* cited by examiner

*Primary Examiner*—Duane Smith
*Assistant Examiner*—Douglas J. Theisen
(74) *Attorney, Agent, or Firm*—Sughrue Mion Pllc.

(57) ABSTRACT

A method of degassing a coating liquid, comprising the step of:
irradiating the coating liquid with a plurality of ultrasonic waves of different frequency bands simultaneously to degass said coating liquid.

7 Claims, 4 Drawing Sheets

FIG.2

| Degassing apparatus condition | Degassed liquid A: gel concentration/9%, viscosity/55 cP | | | | | Degassed liquid B: gel concentration/9%, viscosity/15 cP, methanol concentration/10% | | | | |
|---|---|---|---|---|---|---|---|---|---|---|
| | Degassing apparatus output [%] | | | | | Degassing apparatus output [%] | | | | |
| Simultaneous irradiation with 40 and 120 kHz | 100 | O | O | O | x | x | 100 | O | O | O | O | x |
| | 90 | O | O | O | x | x | 90 | O | O | O | O | x |
| | 80 | O | O | O | x | x | 80 | O | O | O | O | x |
| | 70 | O | O | O | x | x | 70 | O | O | O | O | x |
| | 60 | O | O | O | O | O | 60 | O | O | O | O | x |
| | 50 | O | O | O | O | O | 50 | O | O | O | x | x |
| | 40 | O | O | O | O | x | 40 | O | O | O | x | x |
| | 30 | O | O | O | x | x | 30 | O | O | O | x | x |
| | 20 | O | O | O | x | x | 20 | O | O | O | x | x |
| | 10 | O | O | O | x | x | 10 | O | O | O | x | x |
| | Internal pressure of degassing apparatus 1.0 kgf/cm² | 5.0 | 10.0 | 15.0 | 20.0 | 25.0 | Internal pressure of degassing apparatus 1.0 kgf/cm² | 5.0 | 10.0 | 15.0 | 20.0 | 25.0 |
| | | Flow rate [L/min] | | | | | | Flow rate [L/min] | | | |

FIG.3

| Degassing Apparatus Condition | Degassed Liquid A: Gel concentration/9%, Viscosity/55 cP | | | | | Degassed Liquid B: Gel concentration/9%, Viscosity/15 cP, Methanol concentration/10% | | | | |
|---|---|---|---|---|---|---|---|---|---|---|
| Irradiation with 40 kHz | Degassing Apparatus Output [%] | | | | | Degassing Apparatus Output [%] | | | | |
| | 100 | × | × | × | × | × | 100 | × | × | × | × | × |
| | 90 | × | × | × | × | × | 90 | × | × | × | × | × |
| | 80 | × | × | × | × | × | 80 | × | × | × | × | × |
| | 70 | × | × | × | × | × | 70 | × | × | × | × | × |
| | 60 | × | × | × | × | × | 60 | × | × | × | × | × |
| | 50 | × | × | × | × | × | 50 | × | × | × | × | × |
| | 40 | × | ○ | × | × | × | 40 | × | × | × | × | × |
| | 30 | ○ | ○ | × | × | × | 30 | × | × | × | × | × |
| | 20 | ○ | × | × | × | × | 20 | × | × | × | × | × |
| | 10 | × | × | × | × | × | 10 | × | × | × | × | × |
| Internal pressure of degassing apparatus 1.0 kgf/cm² | 5.0 | 10.0 | 15.0 | 20.0 | 25.0 | Internal pressure of degassing apparatus 1.0 kgf/cm² | 5.0 | 10.0 | 15.0 | 20.0 | 25.0 |
| | Flow rate [L/min] | | | | | Flow rate [L/min] | | | | |

FIG.4

| Degassing Apparatus Condition | | Degassed Liquid A: Gel Concentration/9%, Viscosity/55 cP | | | | | Degassed Liquid B: Gel Concentration/9%, Viscosity/15 cP Methanol Concentration/10% | | | | |
|---|---|---|---|---|---|---|---|---|---|---|---|
| Irradiation with 120 kHz | Degassing Apparatus Output [%] | 5.0 | 10.0 | 15.0 | 20.0 | 25.0 | 5.0 | 10.0 | 15.0 | 20.0 | 25.0 |
| | 100 | × | × | × | × | × | × | × | × | × | × |
| | 90 | × | × | × | × | × | × | × | × | × | × |
| | 80 | × | × | × | × | × | × | × | × | × | × |
| | 70 | × | × | × | O | × | × | × | × | × | × |
| | 60 | × | × | O | O | × | × | × | × | × | × |
| | 50 | × | O | O | O | × | × | × | × | × | × |
| | 40 | × | O | O | O | × | × | × | × | × | × |
| | 30 | × | O | O | O | × | × | × | × | × | × |
| | 20 | × | × | O | O | × | × | × | × | × | × |
| | 10 | × | × | × | × | × | × | × | × | × | × |
| Internal Pressure of Degassing Apparatus | | 1.0 kgf/cm² | | Flow Rate [L/min] | | | 1.0 kgf/cm² | | Flow Rate [L/min] | | |

METHOD AND APPARATUS FOR DEGASSING COATING LIQUID

BACKGROUND OF THE INVENTION

1. Field of the Invention

The present invention relates to a method and apparatus for degassing a coating liquid, and in particular, to a method and apparatus for degassing a coating liquid, which is suitable for degassing a photosensitive material coating liquid, a heat development photosensitive material coating liquid, a transparent heat-sensitive material coating liquid, an organic solvent coating liquid, or the like.

2. Description of the Related Art

In general, in a coating liquid used to coat a support with various liquids, air bubbles are likely to be generated during an operation such as agitation, dispersion, or dispensation which is performed before a coating step. When the coating liquid containing air bubbles is supplied to a coating apparatus, then coated on a support using the apparatus, and dried, bubble defects such as bubble traces or pin holes are likely to occur in the coat film. Consequently, a good and uniform coat film cannot be formed. Therefore, a sufficient degassing process must be executed before the coating step. As a degassing method employed for such a purpose, the use of ultrasonic waves is well known. A large number of proposals for this technique have been made (Japanese Patent Application Publication Nos. 1984-92003, 1988-178807, 1993-92103, 1994-130547, 1996-318102, 1999-262601, 1999-197406, and 1999-290611).

Japanese Patent Application Publication No. 1984-92003 is a proposal that improves the arrangement of ultrasonic vibrators. Japanese Patent Application Publication No. 1988-178807 is a proposal that dissolved air be removed before irradiation with ultrasonic waves. Japanese Patent Application Publication No. 1993-92103 is a proposal that improves the configuration of an ultrasonic degassing apparatus. Japanese Patent Application Publication No. 1994-130547 is a proposal that a vacuum pump be used to reduce pressure before irradiation with ultrasonic waves and that a pressurization pump be used to increase the pressure after the irradiation with ultrasonic waves. Japanese Patent Application Publication No. 1996-318102 is a proposal that is a combination of reduced pressure ultrasonic degassing, pressurized ultrasonic degassing, and management of a liquid temperature. Japanese Patent Application Publication No. 1999-262601 is a proposal that is a combination of a plurality of degassing steps each combined with irradiation with ultrasonic waves. Japanese Patent Application Publication No. 1999-197406 that two degassing baths are provided in series having different conditions for irradiation with ultrasonic waves. Japanese Patent Application Publication No. 1999-290611 is a proposal that the oscillation frequency of ultrasonic waves is continuously modulated to attenuate or eliminate a standing wave to facilitate degassing.

However, there remain problems that cannot be solved by the various proposals using ultrasonic waves. The problems are as follows.

1) The air bubbles in the coating liquid cannot be sufficiently removed.

2) The gas dissolved in the coating liquid is precipitated to form air bubbles again.

3) The coating liquid is damaged or piping through which the coating liquid is transferred is corroded.

4) Ultrasonic waves applied must be optimized in accordance with the composition of the coating liquid or a degassing speed.

5) A combination of supersonic waves with another degassing method results in an increase in the size of the apparatus.

These problems will be described below. First, the problem 1) will be described.

A coating liquid such as a photographic sensitive coating liquid which contains various additives is originally likely to become frothy and is prone to contain air bubbles. Further, in recent years, with improvements in coating methods and productivity, there has been an increase in the viscosity of the coating liquid and in degassing throughput per unit time. Accordingly, although various degassing methods and apparatuses have been proposed, these conventional methods still have an insufficient degassing capability.

One of the reasons for the insufficient degassing capability is that when a liquid accommodated in a degassing container is irradiated with ultrasonic waves at a fixed oscillation frequency, ultrasonic vibration causes a fixed compressional wave to be formed. Thus, a standing wave is generated. The standing wave creates problems; air bubbles in the liquid are trapped in a particular area to prevent the bubbles from floating, or the standing wave degrades the capability of dissolving and eliminating fine air bubbles. As a result, air bubbles cannot be removed effectively.

To solve this problem, for example, Japanese Patent Application Publication Nos. 1984-92003, 1993-92103, and 1999-197406 propose configurations in which a plurality of ultrasonic vibrators are arranged on the bottom and sides of a degassing container and opposite one another. In this configuration, ultrasonic waves applied by the individual ultrasonic vibrators are complementary to one another. However, these configurations can increase the quantity of ultrasonic waves applied per unit area of the degassing container to improve degassing efficiency, but fail to eliminate the standing wave. It is thus difficult for these proposals to efficiently and perfectly remove air bubbles from the liquid.

To solve this problem, Japanese Patent Application Publication No. 1999-290611 and the like propose that the oscillation frequency of ultrasonic waves applied is continuously modulated over a predetermined frequency bandwidth around a frequency used as a reference to periodically continuously vary the distribution of sound pressure of ultrasonic waves applied to a coating liquid. This configuration has substantially solved the problem that bubbles in the coating liquid cannot be sufficiently removed. However, the degassing achieved by this configuration may be insufficient depending on the physical properties of the liquid and a degassing process speed per unit time. Specifically, The output of ultrasonic waves for each physical property of the liquid must be individually set in view of the degassing process speed per unit time.

Now, the problem 2) will be described. In the conventional ultrasonic degassing apparatus, a coating liquid is accommodated in the degassing bath and then irradiated with ultrasonic waves. When this apparatus is used to irradiate the coating liquid with ultrasonic waves, the pressure of the coating liquid varies to facilitate the dissolution of air bubbles in the liquid under pressure. This effect is further enhanced by increasing the output of ultrasonic waves. However, an excessive increase in the output of ultrasonic waves causes fine air bubbles of negative pressure, that is, cavitation to be instantaneously generated in the liquid and then disappear. When the cavitation disappears, a local reaction field estimated to have a pressure of 87,000 atm and a temperature of 160,000° C. is instantaneously formed to precipitate a gas again which has been dissolved in the surrounding liquid. This phenomenon is likely to occur if the output of ultrasonic waves is excessively increased and if the degassing process speed per unit area is low.

Now, the problem 3) will be described. In the conventional ultrasonic degassing apparatus, as already described, when the cavitation disappears, a shock wave is generated which instantaneously forms a local reaction field estimated to have a pressure of 87,000 atm and a temperature of 160,000° C. Thus, the coating liquid may be damaged or piping through which the coating liquid is transferred may be corroded.

Now, the problem 4) will be described. In the conventional ultrasonic degassing apparatus, bubbles are likely to precipitate in the case of insufficient degassing and an excessive increase in the output of ultrasonic waves. To deal with this, for example, Japanese Patent Application Publication No. 1999-197406 and No. 1999-290611 and the like propose the following configurations: the one that externally transmits one or more frequency variation cycles of ultrasonic vibration to the coating liquid in a reservoir or transfer pipe; in a frequency variation cycle, vibration varies from a low frequency to a high frequency, and the one that continuously modulates the oscillation frequency of ultrasonic waves applied, over a predetermined frequency bandwidth around a frequency used as a reference to periodically continuously vary the distribution of sound pressure of ultrasonic waves applied to the coating liquid. An ultrasonic degassing system with this frequency modulating system has significantly reduced the insufficiency of degassing. However, the degassing may still be insufficient depending on the physical properties of the liquid and the degassing process speed per unit time. Thus, disadvantageously, the output of ultrasonic waves for each physical property of the liquid must be individually set in view of the degassing process speed per unit time.

Now, the problem 5) will be described. Japanese Patent Application Publication No. 1999-130547, No. 1996-318102 and No. 1999-262601 and the like propose configurations having a plurality of degassing steps obtained by combining the ultrasonic degassing method with other degassing methods. For example, according to Japanese Patent Application Publication No. 1994-130547, a coating liquid is guided to a predetermined degassing container, and the pressure of the coating liquid is reduced to float and remove air bubbles. Then, the interior of the same degassing container is pressurized, which the coating liquid is irradiated with ultrasonic waves. Consequently, air bubbles are dissolved in the coating liquid. This method has a certain degassing capability. However, since the same container must undergo a plurality of steps, the degassing process requires a long time. Further, disadvantageously, the size of the apparatus must be increased.

SUMMARY OF THE INVENTION

The present invention is made in view of these circumstances. It is an object of the present invention to provide a method and apparatus for degassing a coating liquid which method and apparatus are suitable for forming a good and uniform coat film by preventing bubble defects caused by air bubbles contained in the coating liquid during a step in which a coating apparatus is used to coat a support with a liquid such as a photosensitive material coating liquid.

It is another object of the present invention to provide a method and apparatus for degassing a coating liquid of high viscosity which method and apparatus can effectively remove air bubbles from the coating liquid in a short time if the degassing process speed per unit time is high.

It is another object of the present invention to provide a method and apparatus for degassing a coating liquid which method and apparatus can suppress damage to the coating liquid caused by a shock wave resulting from the disappearance of the cavitation as well as corrosion in piping through which the coating liquid is transferred, while inhibiting re-precipitation of a gas dissolved in the surrounding liquid which re-precipitation is caused by a local reaction field resulting from the disappearance of the cavitation.

To accomplish these objects, the present invention provides a method of degassing a coating liquid, comprising the step of: irradiating the coating liquid with a plurality of ultrasonic waves of different frequency bands simultaneously to degass said coating liquid.

The present invention also provides a coating liquid degassing apparatus, comprising:

a tubular member having, at one end, a port through which a coating liquid flows in and, at the other end, a port through which the coating liquid flows out, and a plurality of ultrasonic vibrators secured to an outer periphery of the tubular member, wherein the tubular member can be internally simultaneously irradiated with the a plurality of ultrasonic waves of different frequency bands.

According to the present invention, the coating liquid is degassed by being simultaneously irradiated with a plurality of ultrasonic waves of different frequency bands. This makes it possible to suppress cavitation caused by irradiation with ultrasonic waves of a single frequency. It is also possible to enhance the coating liquid vibrating phenomenon to facilitate the vibration of the interface between the liquid and air bubbles in the liquid. Consequently, the bubbles can be efficiently dissolved in the liquid. As a result, bubble defects can be prevented which may be caused by air bubbles contained in the coating liquid. Therefore, a good and uniform coat film can be formed.

Further, in particular, if the coating liquid has a high viscosity and the degassing processing speed per unit time is high, bubbles can be efficiently removed from the coating liquid in a short time.

Moreover, the present invention can suppress damage to the coating liquid caused by a shock wave resulting from the disappearance of cavitation as well as corrosion in piping through which the coating liquid is transferred. The present invention can also inhibit the re-precipitation of a gas dissolved in the surrounding liquid in a local reaction field resulting from the disappearance of the cavitation.

According to the present invention, preferably, the coating liquid is free from gas-liquid interfaces and is pressurized to at least 10 kPa. Degassing under these conditions facilitates production of the effects of the present invention.

Further, according to the present invention, the coating liquid is preferably any of a photographic sensitive material coating liquid, a heat development photosensitive material coating liquid, a transparent heat-sensitive material coating liquid, and an organic solvent coating liquid. The application of these types of coating liquids facilitates production of the effects of the present invention.

As described above, according to the present invention, the coating liquid is degassed by being simultaneously irradiated with a plurality of ultrasonic waves of different frequency bands. This makes it possible to suppress cavitation caused by irradiation with ultrasonic waves of a single frequency. It is also possible to enhance the coating liquid vibrating phenomenon to facilitate the vibration of the interface between the liquid and air bubbles in the liquid. Consequently, the bubbles can be efficiently dissolved in the liquid. As a result, bubble defects can be prevented which may be caused by air bubbles contained in the coating liquid. Therefore, a good and uniform coat film can be formed.

BRIEF DESCRIPTION OF THE DRAWINGS

FIG. 2 is a table showing the results of an example;
FIG. 3 is a table showing the results of a comparative example;
and
FIG. 4 is a table showing the results of a comparative example.

DETAILED DESCRIPTION OF THE PREFERRED EMBODIMENTS

Figure 1:
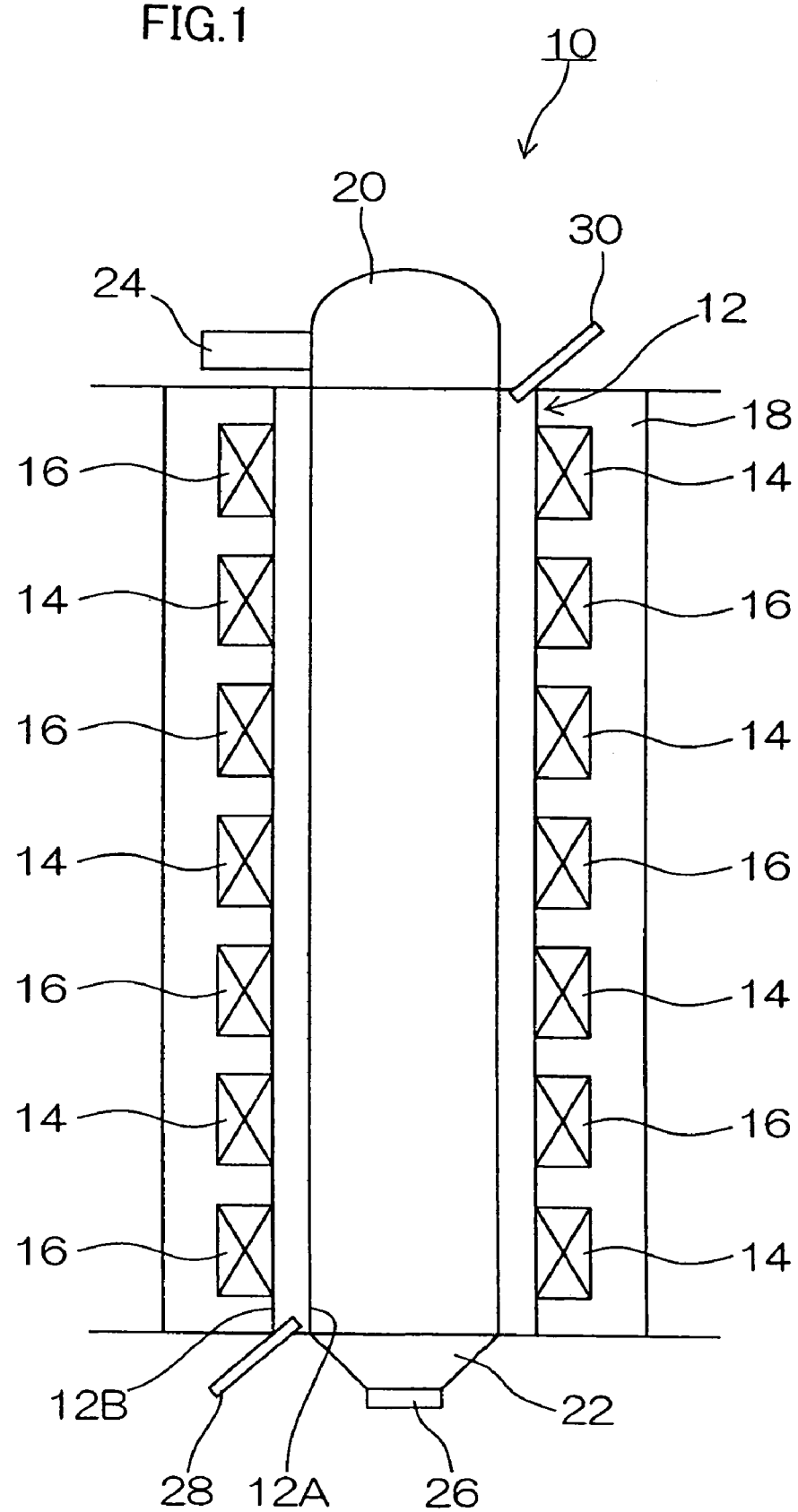
FIG. 1 is a sectional view illustrating the configuration of a coating liquid degassing apparatus.

An embodiment of the present invention will be described below with reference to the accompanying drawings. FIG. 1 is a sectional view illustrating the configuration of a coating liquid degassing apparatus 10 applied to the present invention. The coating liquid degassing apparatus 10 is composed of a degassing pipe 12, a tubular member through which a coating liquid flows, a plurality of ultrasonic vibrators 14 and 16 secured to an outer peripheral surface of the degassing pipe 12, and a cover 18 that covers the whole apparatus.

The degassing pipe 12 is a double pipe in which an inner pipe 12A and an outer pipe 12B are concentrically disposed. A coating liquid flows through the inner pipe 12A. Temperature regulating water can circulate between an outer surface of the inner pipe 12A and an inner surface of the outer pipe 12B.

Specifically, an upper end of the inner pipe 12A is closed by a top cover 20, while a lower end of the inner pipe 12A is closed by a bottom cover 22. A coating liquid supply port 24 is provided on the top cover 20, while a coating liquid discharge port 26 is provided on the bottom cover 22, respectively. Piping (not shown) from coating liquid supply device (dispensing pump or the like) can be connected to the coating liquid supply port 24. Return piping (not shown) to the coating liquid supply device can be connected to the coating liquid discharge port 26. A pressure regulating valve is provided in a piping path located downstream of the coating liquid discharge port 26. This makes it possible to adjust a pressure exerted on the coating liquid flowing through the inner pipe 12A.

The coating liquid supply device is preferably metering dispensing device that can continuously dispense the liquid at a fixed flow rate, generally a metering pump (dispensing device with a varying flow rate such as a plunger pump or a gear pump).

The cross section of the degassing pipe 12 may be not only circular but also polygonal. Further, the degassing pipe 12 and its surrounding materials are preferably configured to withstand an internal pressure of at least 10 kPa.

The top cover 20 is transparent and is shaped like a dome. Accordingly, degassing of the coating liquid inside the degassing pipe 12 can be observed through the top cover 20.

A space is formed by the outer surface of the inner pipe 12A and the inner surface of the outer pipe 12B. The space is closed at its upper end and lower end. A temperature regulating water supply port 28 is provided at the lower end, while a temperature regulating water discharge port 30 is provided at the upper end. Piping (not shown) from a circular thermostatic liquid bath can be connected to the temperature regulating water supply port 28. Return piping (not shown) to the circular thermostatic liquid bath can be connected to the temperature regulating water discharge port 30. This enables the temperature regulating water to circulate through the space formed by the outer surface of the inner pipe 12A and the inner surface of the outer pipe 12B. It is therefore possible to regulate the temperature of the coating liquid flowing through the interior of the inner pipe 12A.

A plurality of ultrasonic vibrators 14 and 16 are secured to an outer peripheral surface of the outer pipe 12B. The ultrasonic vibrators 14 have an oscillation frequency of 40 kHz, whereas the ultrasonic vibrators 16 have an oscillation frequency of 120 kHz. These ultrasonic vibrators 14 and 16 are alternately juxtaposed so that the ultrasonic vibrators standing opposite each other across the inner pipe 12A have the different oscillation frequencies as shown in FIG. 1. This configuration enables the interior of the inner pipe 12A to be simultaneously irradiated with a plurality of ultrasonic waves of different frequency bands.

A comparative example described later employs the coating liquid degassing apparatus 10 configured as shown in FIG. 1 and in which all of the ultrasonic vibrators 14 and 16 have an oscillation frequency of 40 kHz.

In a circumferential direction, the ultrasonic vibrators 14 and 16 have only to be positioned so that at least two (one pair) of them stand opposite each other across the inner pipe 12A. However, plural pairs of ultrasonic vibrators are preferably provided in terms of efficiency. In any case, an appropriate configuration may be employed in accordance with the size (outer diameter) of the degassing pipe 12 and the size and specification of the ultrasonic vibrators 14 and 16.

The operation of the coating liquid degassing apparatus 10 will be described below.

The coating liquid supplied by the coating liquid supply device flows through the coating liquid supply port 24 into the inner pipe 12A. After flowing through the interior of the inner pipe 12A, the coating liquid returns to the coating liquid supply device via the coating liquid discharge port 26. In this case, the pressure regulating valve, provided in the piping path located downstream of the coating liquid discharge port 26, maintains the interior of the inner pipe 12A in a predetermined pressure state. Further, the temperature regulating water circulates through the space formed by the outer surface of the inner pipe 12A and the inner surface of the outer pipe 12B. This serves to regulate the temperature of the coating liquid flowing through the interior of the inner pipe 12A. Moreover, the ultrasonic vibrators 14 and 16 irradiate the coating liquid with a plurality of (in this case, two types of) ultrasonic waves of different frequency bands simultaneously via the temperature regulating water and inner pipe 12A.

The coating liquid is simultaneously irradiated with ultrasonic waves of oscillation frequencies of 40 and 120 kHz. This makes it possible to suppress cavitation caused by irradiation with ultrasonic waves of a single oscillation frequency (for example, 40 kHz). It is also possible to enhance the coating liquid vibrating phenomenon to facilitate the vibration of the interface between the liquid and air bubbles in the liquid. Consequently, the bubbles can be efficiently dissolved in the liquid.

In addition to the suppression of cavitation of the liquid which suppression is carried out by the method of irradiation with a plurality of ultrasonic waves of the different frequency bands, activation of vibration of the liquid can be accomplished. This effect is considered to be produced by the interference state of the ultrasonic waves in the liquid affecting ultrasonic energy applied to the liquid, thus shifting a bubbling phenomenon to a vibrating phenomenon.

Further, by simultaneously irradiating the coating liquid with ultrasonic waves of oscillation frequencies of 40 and 120 kHz, it is possible to suppress damage to the coating liquid caused by a shock wave resulting from the disappearance of cavitation as well as corrosion in piping through which the coating liquid is transferred. This also makes it possible to inhibit the re-precipitation of a gas dissolved in the surrounding liquid which re-precipitation is caused by a local reaction field resulting from the disappearance of the cavitation.

Description has been given of the embodiment of the method of degassing a coating liquid and the coating liquid degassing apparatus according to the present invention. The present invention is not limited to the above embodiment but various aspects may be employed.

For example, in the present embodiment, the coating liquid degassing apparatus 10 shown in FIG. 1 is configured to use the two types of ultrasonic vibrators 14 and 16. However, three types of ultrasonic vibrators (having oscillation frequencies of, for example, 40, 80, and 120 kHz) may be used. Such a configuration can produce similar effects.

Further, instead of the degassing pipe 12 extending in a vertical direction, as in the coating liquid degassing apparatus 10 shown in FIG. 1, a degassing pipe 12 extending in a horizontal direction may be employed.

EXAMPLES

In the description below, an example of the present invention will be compared with a comparative example.

The coating liquid degassing apparatus 10 configured as shown in FIG. 1 was used in both example and comparative example. As already described, in the example, the ultrasonic vibrators 14 had an oscillation frequency of 40 kHz, while the ultrasonic vibrators 16 had an oscillation frequency of 120 kHz. In the comparative example, the ultrasonic vibrators 14 and 16 had an oscillation frequency of 40 or 120 kHz.

The maximum total output of ultrasonic waves was 1,500 W in both example and comparative example. The total output was varied at 10% increments up to 10 to 100% of the maximum value.

The inner pipe 12A had an inner diameter of 124 mm and a length of 845 mm. A uniform pressure (liquid pressure) of 98 kPa (1.0 kgf/cm$^2$) was exerted on the interior of the inner pipe 12A.

A flow rate of the coating liquid is varied from 5.0 to 25.0 liter per minute in increments of 5 liter.

Two types of coating liquids described below (degassed liquid A and degassed liquid B) were prepared. The degassed liquid A was composed of a gelatin solution of concentration 9% to which a surface active agent (a 10% solution of α-hexedecyl-ω-hydroxypolyoxyethylene) was added so that the amount of surface active agent was 2% of the total amount of gelatin solution and to which a (Potadium4-Vinylbenzensulfonatepolymer) was also added to adjust the viscosity to 55 cP.

The degassed liquid B was composed of a gelatin solution of concentration 9% to which a surface active agent (a 10% solution of α-hexedecyl-ω-hydroxypolyoxyethylene) was added so that the amount of surface active agent was 2% of the total amount of gelatin solution and to which a (Potadium4-Vinylbenzensulfonatepolymer) and methanol were added so that the concentration was 10%, to adjust the viscosity to 15 cP.

A specified amount of air bubbles of size 30 to 500 μm were mixed in both degassed liquids A and B.

The effect of the degassing process by the coating liquid degassing apparatus 10 was evaluated for the acceptability of degassing (the presence of bubbles detected) by comparing detection signals from air bubble detectors (not shown) provided upstream and downstream of the degassing pipe 12 (the detection signal (voltage) changed when air bubbles passed); the detection of air bubbles was shown by a cross, and the non-detection of air bubbles was shown by a circle.

The table in FIG. 2 shows the results of the example of the present invention, while FIGS. 3 and 4 show the results of the comparative example. First, the results for the high-viscosity (55 cP) degassed liquid A will be compared. In the comparative example with the single oscillation frequency of 40 kHz, degassing was possible (;) under only 4 of 50 conditions. Three of these four conditions involved a coating liquid flow rate of 5.0 liter/min. The remaining one condition involved a coating liquid flow rate of 10.0 liter/min. However, the degassing was possible (;) when the total output of ultrasonic waves was 20 to 40% rather than 100%. This is estimated to be because cavitation occurred when the total output of ultrasonic waves was high.

In the comparative example with the single oscillation frequency of 120 kHz, degassing was possible (;) under only 6 of the 50 conditions. All of these six conditions involved a coating liquid flow rate of 5.0 liter/min. This is estimated to be because the liquid vibrates weakly at 120 kHz than at 40 kHz. Further, the degassing was possible (;) when the output was 20 to 70%. This is estimated to be because cavitation occurred when the total output of ultrasonic waves was high.

On the other hand, in the example with the two types of oscillation frequencies (40 kHz and 120 kHz), degassing was possible (;) under 36 of the 50 conditions. In this case, degassing was possible (;) regardless of the total output of ultrasonic waves when the flow rate of the coating liquid was 5.0, 10.0, or 15.0 liter/min. The condition under which degassing was possible (;) were increasingly limited as the flow rate of the coating liquid increased.

The above results demonstrate the effects of the present invention on the high-viscosity (55 cP) degassed liquid A.

Then, the results for the low-viscosity (15 cP) degassed liquid B containing methanol will be compared. In the comparative example with the single oscillation frequency of 40 kHz and 120 kHz, degassing was possible (;) under none of the 50 conditions.

On the other hand, in the example with the two types of oscillation frequencies (40 kHz and 120 kHz), degassing was possible (;) under 38 of the 50 conditions. In this case, degassing was possible (;) regardless of the total output of ultrasonic waves when the flow rate of the coating liquid was 5.0, 10.0, or 15.0 liter/min. The condition under which degassing was possible (;) were increasingly limited as the flow rate of the coating liquid increased.

The above results demonstrate the effects of the present invention on the low-viscosity (15 cP) degassed liquid B containing methanol.

What is claimed is:

1. A method of degassing a coating liquid, comprising the step of:
   irradiating the coating liquid with a plurality of ultrasonic waves of different frequency bands simultaneously to degass said coating liquid;
   wherein said coating liquid is free from a gas-liquid interface and is pressurized to at least 10 kPa.

2. The method of degassing a coating liquid according to claim 1, wherein said coating liquid is any of a photosensitive material coating liquid, a heat development photosensitive material coating liquid, a transparent heat-sensitive material coating liquid, and an organic solvent coating liquid.

3. A coating liquid degassing apparatus, comprising:
   a tubular member having, at one end, a port through which a coating liquid flows in and, at the other end, a port through which the coating liquid flows out, and
   a plurality of ultrasonic vibrators secured to an outer periphery of the tubular member,
   wherein the tubular member can be internally simultaneously irradiated with a plurality of ultrasonic waves of different frequency bands;
   a first ultrasonic vibrator is located across from a second ultrasonic vibrator, and
   the first ultrasonic vibrator emits ultrasonic waves with a different frequency band than the second ultrasonic vibrator.

4. The coating liquid degassing apparatus according to claim 3, wherein the tubular member has a polygonal shape in a cross-section.

5. The coating liquid degassing apparatus according to claim 3, wherein
   each of a plurality of second ultrasonic vibrators is located across from a first ultrasonic vibrator, and
   the first ultrasonic vibrators emit ultrasonic waves with a different frequency band than the second ultrasonic vibrators.

6. A method of degassing a coating liquid, comprising the steps of:
   irradiating the coating liquid with a plurality of ultrasonic waves of different frequency bands simultaneously to degass said coating liquid;
   emitting ultrasonic waves with a first frequency band from a first ultrasonic vibrator, and
   emitting ultrasonic waves with a second frequency band from a second ultrasonic vibrator;
   wherein the first ultrasonic vibrator is secured to an outer periphery of a tubular member, and
   the second ultrasonic vibrator is secured to the outer periphery of the tubular member across from the first ultrasonic vibrator.

7. The method of degassing a coating liquid according to claim 6, further comprising:
   emitting ultrasonic waves with a first frequency band from a plurality of first ultrasonic vibrators, and
   emitting ultrasonic waves with a second frequency band from a plurality of second ultrasonic vibrators;
   wherein the plurality of first ultrasonic vibrators are secured to an outer periphery of a tubular member,
   the plurality of second ultrasonic vibrators are secured to the outer periphery of the tubular member, and
   each second ultrasonic vibrator is located across from a first ultrasonic vibrator.

* * * * *